United States Patent
Leflaive et al.

(10) Patent No.: US 8,821,732 B2
(45) Date of Patent: Sep. 2, 2014

(54) DEVICE FOR SIMULATED MOVING BED SEPARATION

(75) Inventors: Philibert Leflaive, Mions (FR); Tom Frising, Lyons (FR); Damien Leinekugel-Le-cocq, Lyons (FR); Gerard Hotier, Rueil Malmaison (FR)

(73) Assignee: IFP Energies Nouvelles, Rueil Malmaison Cedex (FR)

( * ) Notice: Subject to any disclaimer, the term of this patent is extended or adjusted under 35 U.S.C. 154(b) by 844 days.

(21) Appl. No.: 12/809,858

(22) PCT Filed: Dec. 1, 2008

(86) PCT No.: PCT/FR2008/001677
§ 371 (c)(1),
(2), (4) Date: Feb. 25, 2011

(87) PCT Pub. No.: WO2009/101282
PCT Pub. Date: Aug. 20, 2009

(65) Prior Publication Data
US 2011/0166406 A1    Jul. 7, 2011

(30) Foreign Application Priority Data
Dec. 21, 2007   (FR) .................................... 07 09127

(51) Int. Cl.
*B01D 15/08* (2006.01)
*B01D 15/18* (2006.01)
*C07C 7/12* (2006.01)

(52) U.S. Cl.
CPC .................................. *B01D 15/1842* (2013.01)
USPC ........ 210/659; 210/198.2; 210/662; 585/825; 585/828

(58) Field of Classification Search
CPC .... B01D 15/08; B01D 15/18; B01D 15/1821; B01D 15/1842; B01D 15/85; B01D 15/26; B01D 15/265; B01J 20/281; C07C 7/12

USPC ............... 585/820, 825, 828; 210/198.2, 263, 210/656, 659, 662; 127/46.1, 46.2
See application file for complete search history.

(56) References Cited

U.S. PATENT DOCUMENTS 5,578,216 A    11/1996 Hotier et al.
(Continued)

FOREIGN PATENT DOCUMENTS

| EP | 1205224 A1 | 5/2002 |
|---|---|---|
| FR | 1330356 A | 6/1963 |
| FR | 1330356 T | 6/1963 |

(Continued)

*Primary Examiner* — Joseph Drodge
(74) *Attorney, Agent, or Firm* — Millen, White, Zelano & Branigan, P.C.

(57) ABSTRACT

A device (SMB) for separation by simulated moving bed adsorption comprises a plurality of elementary zones $Z_i$ in series operating in a closed loop, each of said zones comprising, between two successive fluid injection or extraction points, a unique bed $L_i$ of adsorbant solid with volume $VA_i$ and a non-selective free volume $V_i$, in which the majority of the zones are ordinary elementary zones each having an identical volume VA of the same adsorbant S, and a substantially identical non-selective free volume equal to V;

the device also comprises at least one particular elementary zone $Z_0$, termed the particular elementary zone, comprising a non-selective free volume $V_0$ which is greater than V, and a unique bed $L_0$ of adsorbant $S_0$ with volume $VA_0$ which is less than VA, $S_0$ having a volume adsorption capacity $C_0$ which is greater than that, C, of S, such that the overall adsorption capacity $C_0 \times VA_0$ of $Z_0$ is closer to the overall adsorption capacity $C \times VA$ of each of the ordinary elementary zones than the overall adsorption capacity of $Z_0$ calculated as if the adsorbant solid of bed $L_0$ of $Z_0$ were not the solid $S_0$ but the solid S.

18 Claims, 1 Drawing Sheet

(56) References Cited

U.S. PATENT DOCUMENTS 6,106,702 A * 8/2000 Sohn et al. ............... 208/310 Z
6,136,198 A   10/2000 Adam et al.
6,896,812 B1   5/2005 Frey

FOREIGN PATENT DOCUMENTS

| FR | 2721529 A1 | 12/1995 |
| FR | 2785196 A1 | 5/2000 |
| WO | 2008001677 R | 12/2008 |

* cited by examiner

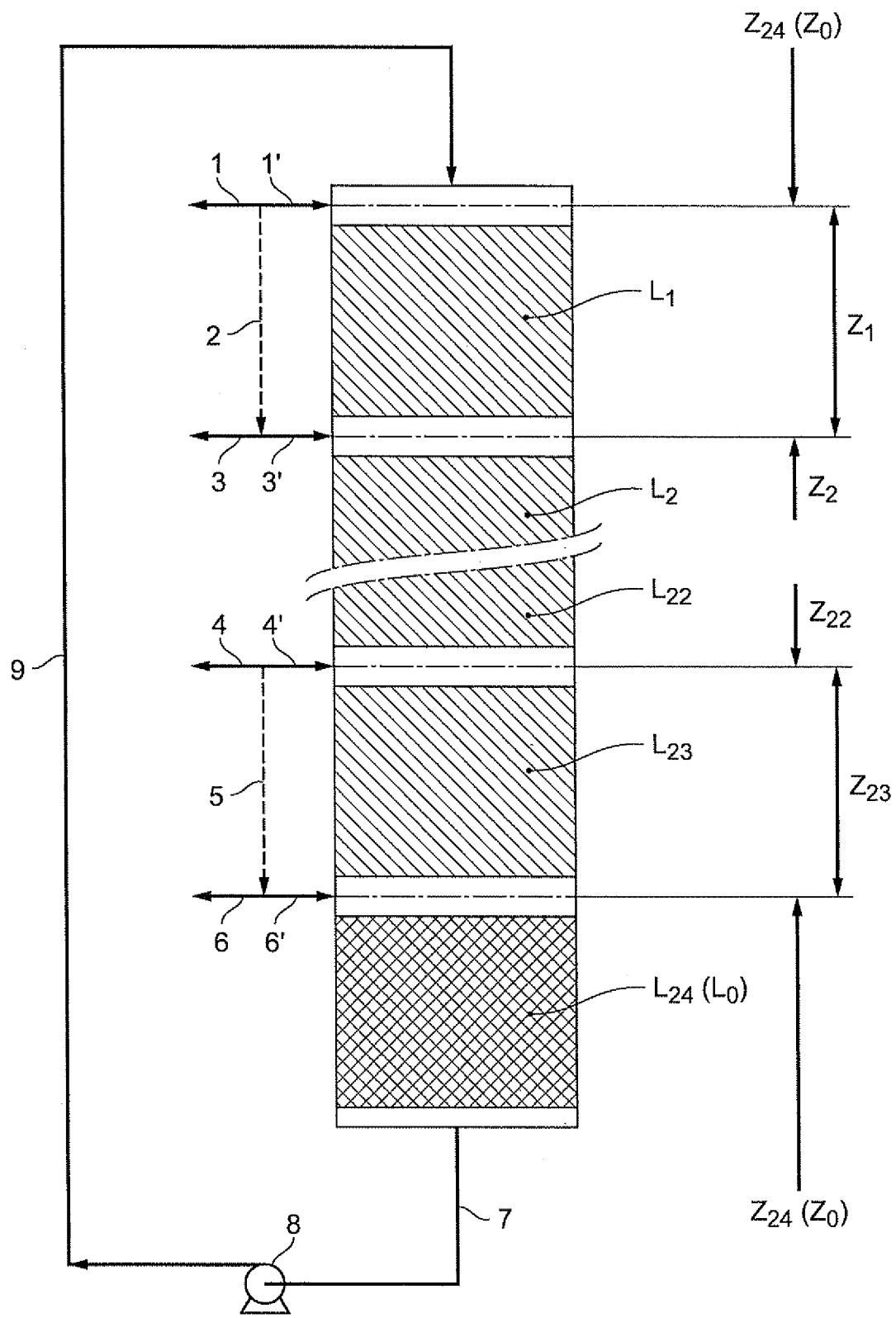

DEVICE FOR SIMULATED MOVING BED SEPARATION

FIELD OF THE INVENTION

The invention relates to the field of separating natural or chemical products which are difficult to separate by distillation. A family of processes and associated devices is thus used which are known as "chromatographic" or "simulated moving bed" or "simulated counter-current" or "simulated co-current" processes or separation devices which we shall hereinafter term "SMB" processes.

Particular but non-exclusive fields which are concerned are as follows:
separation of normal paraffins from branched paraffins, naphthenes and aromatics;
olefin/paraffin separation;
separating para-xylene from other aromatic C8 isomers;
separating meta-xylene from other aromatic C8 isomers;
separating ethylbenzene from other aromatic C8 isomers.

Beyond the refinery and petrochemicals complex there are numerous other applications; examples which may be cited include glucose/fructose separation, separating positional isomers of cresol, separating optical isomers, etc.

PRIOR ART

SMB chromatographic separation is well known in the art. In general, a simulated moving bed comprises at least three chromatographic zones, and optionally four or five, each of said zones being constituted by at least one bed or column portion and included between two successive supply or withdrawal points. Typically, at least one feed F to be fractionated and a desorbant D (occasionally termed the eluent) are supplied and at least one raffinate R and an extract E are withdrawn. The supply and withdrawal points are modified over time, typically offset towards the bottom of a bed and in a synchronous manner.

By definition, each of the functional zones is designated a number:
zone 1=a zone for desorption of the desired product (contained in the extract) included between injection of the desorbant D and removal of the extract E;
zone 2=a zone for desorption of raffinate compounds included between removal of the extract E and injection of the feed to be fractionated F;
zone 3=a zone for adsorption of desired product, included between injection of the feed and withdrawal of raffinate R; and
preferably, a zone 4 located between the raffinate withdrawal and the desorbant injection.

The prior art describes in great detail various devices and processes which can carry out the simulated moving bed separation of feeds. In particular, U.S. Pat. No. 2,985,589, U.S. Pat. No. 3,214,247, U.S. Pat. No. 3,268,605, U.S. Pat. No. 3,592,612, U.S. Pat. No. 4,614,204, U.S. Pat. No. 4,378,292, U.S. Pat. No. 5,200,075, and U.S. Pat. No. 5,316,821 may be cited. Said patents also describe the function of an SMB in detail.

SMB devices typically comprise at least one column (frequently two), beds $A_i$ of adsorbant disposed in said column, separated by plates $P_i$ with chamber(s) $C_i$ for distribution and/or extraction of fluids to or from various beds of adsorbents, and programmed means for sequential distribution and extraction of fluids.

Certain devices use not just one or more columns but a plurality of adsorbers with a bed of a unique adsorbant which are separate and connected via transfer lines.

In general, either all of the fluid or principal flux is transmitted through the column in accordance with a flow chart as described in U.S. Pat. No. 2,985,589, or a large proportion or all of that flux is taken out, in accordance with the process described in U.S. Pat. No. 5,200,075.

The programmed means for distribution and extraction of fluids from a SMB are typically one of the two following major types of technology:
either, for each plate, a plurality of programmed on-off valves to supply or withdraw fluids, said valves typically being located in the immediate vicinity of the corresponding plate and in particular comprising, for each plate $P_i$, at least 4 programmed 2-way on-off valves to allow the supply of fluids F and D and withdrawal of fluids E and R respectively;
or a rotary multi-way valve to supply and withdraw fluids from the plate assembly.

Each of the plates $P_i$ typically comprises a plurality of distributor-mixer-extractor or "DME" panels supplied via lines or "distribution/extraction manifolds". The plates may have any type and geometry, in particular with panels forming adjacent sectors in the column section, for example panels with angular sectors as described in FIG. 8 of U.S. Pat. No. 6,537,451, which are supplied symmetrically (manifold), or parallel sectors such as those cut out of a circumference, as indicated in published patent application US-03/0 127 394, which have a bi-symmetrical supply. Preferably, the separation column comprises DME plates of the parallel sector type with bi-symmetrical supplies (in the present invention, the terms panels or sectors will be used indiscriminately). More preferably, the adsorb ant is densely packed. This means that a larger quantity of adsorbant can be used in a given column and the purity of the desired product and/or the feed flow rate of the SMB can be increased.

Distribution over each bed requires collecting the flux deriving from the preceding bed (principal fluid moving along the principal axis of the column), the possibility of injecting into it an auxiliary or secondary fluid while mixing these two fluids to as great an extent as possible, or the possibility of removing a portion of the collected fluid, extracting it to send it out of the device and also of re-distributing a fluid over the subsequent bed.

This can be achieved by using, in a plate $P_i$, chambers $C_{i,k}$ for distribution (injection/extraction) which may be separate from or common with the mixing chambers. Plates $P_i$ with one or more chambers are known which may be supplied (or withdrawn) separately by different fluids at a given time, or supplied (or withdrawn) simultaneously and in parallel using the same fluid at a given time. In the first case, the plate is said to have a plurality of distribution networks, while in the second case there is a unique distribution network.

A generic problem with all SMB devices is that of minimizing the pollution generated by the liquid which is encountered in the various zones and volumes of the circuits for supplying and extracting fluids to/from the plates, during modifications to the supply and withdrawal points during operation of the SMB. When during the operational sequence a line, chamber or supply zone for a plate $P_i$ is no longer flushed by a process fluid, it becomes a dead zone in which the liquid stagnates, and is only moved again when another process fluid moves in it. Since the function of the SMB means that this is a different process fluid, the liquid in the dead zone is necessarily displaced by a liquid with a substantially different composition. Mixing or moving fluids over short time intervals with substantially different compositions thus introduces a perturbation with respect to ideal operation which brooks no discontinuities in composition.

Another problem lies in possible (but frequent) re-circulation between the various zones of the same plate and more generally the whole of the distribution/extraction system of a single plate, because of the very small differences in pressure between the various zones of a plate, which also then causes a perturbation compared with the ideal operation.

In order to overcome these problems connected with re-circulation and dead zones, various techniques are already known in the art:

a) it has been proposed to flush the distribution/extraction system at a single plate in particular using relatively pure desired product or desorbant. That technique can avoid pollution of the desired product upon extraction thereof. However, since the composition of the flush liquid is typically very different from the liquid it is displacing, this introduces discontinuities in composition which are prejudicial to the ideal operation. This first flushing variation typically carries out "short duration flushes with a high concentration gradient". Such flushes are over a short time interval in order to limit the compositional discontinuity effect;

b) as described in U.S. Pat. No. 5,972,224, another solution consists in passing a majority of the principal flux towards the interior of the column and a minority of that flux towards the exterior, typically 2% to 20% of the flux, via external bypass lines between neighbouring plates. Said flushing of the distribution/extraction system at a plate using a flush deriving from a neighbouring plate is typically carried out during most of the time or continuously, such that the lines and zones of the distribution/extraction system are no longer "dead" but flushed. Such a system with flushing via bypass lines is shown in FIG. 1 of U.S. Pat. No. 5,972,224 and reiterated in a simplified manner in FIG. 1 of the present application.

Another major problem encountered during regulation of said separation units are individual "non-selective free volumes" within the loop. The term "individual" will hereinafter be used for any portion of the non-selective free volume which is not uniformly distributed in the circuit. This term is defined more precisely below. A typical example is a conduit which connects one column to another or a conduit for recycling from the column bottom to the head of that column (when the adsorbant is loaded into a single column), with all the equipment associated with that or those conduits (for example: pump, measurement or sampling means, removal loop, etc). Those types of free volumes of adsorbent are non-selective because they do not carry out selective adsorption.

Patents FR-2 721 527, FR-2 721 528, FR-2 721 529 and U.S. Pat. No. 6,896,812 explain the fact that perturbations may be caused by "non-selective free volumes" occasioned by the recycle pump as well as the various sampling or analysis devices.

FR-2 721 527 proposes compensating for the individual non-selective free volumes by increasing the delivery of the recycle pump from the moment when the extract withdrawal point (if the extract is the flux containing the product to be separated) is between the outlet from bed n−1 and the outlet from bed n (page 6). In practice, the delivery is increased when the extract is removed from the $n^{th}$ bed (that which contains a non-selective free volume which is greater than the others). This increase in the delivery results in an increase in the flow rate for all beds during that period, as can be seen in Example 1B (in accordance with the invention) of that patent. This results in the disadvantage of having a greater (and non-optimal) hydraulic load (pressure drop, etc) over the sieve and the adsorber and a perturbation in the profiles in the unit which results in non-optimal operation even though the purity is improved compared with that which would be obtained without compensation.

U.S. Pat. No. 6,896,812 also overcomes the problem of perturbations caused by non-selective free volumes by modifying the flow rate of the zone in which said non-selective volumes are located. The solutions recommended in U.S. Pat. No. 6,896,812 and FR-2 721 527 essentially differ in that FR-2 721 527 increases the delivery from the recycle pump and thus in the whole adsorber while U.S. Pat. No. 6,896,812 increases the injection flow rate (of feed or desorbant) but at the same time reduces a withdrawal (extract or raffinate) flow rate by an equivalent quantity such that the increase in the flow rate is only felt by a portion (one zone) of the adsorber. Thus, even though the increase in flow rate is restricted to a portion of the process in U.S. Pat. No. 6,896,812, it nevertheless persists for part of the cycle, giving rise to the same problems as those which arise in FR-2 721 527. It should also be emphasized that U.S. Pat. No. 6,896,812 does not suggest any explicit means for carrying out the invention and gives no information on the actual impact of the problems induced by large changes in the flow rates which the injection and withdrawal fluxes must undergo, these latter generally being substantially lower than the flow rate of the principal fluid.

Patent FR-2 721 528 proposes increasing the switch time period each time an injection stream (feed or desorbant) or withdrawal stream (extract or raffinate) passes the recycle pump and thus the volume of the non-selective discrete section. However, that patent imposes two conditions for it to be able to be carried out each circuit must be permutated independently. This means that each of the fluxes introduced or removed must be managed either by an n-position valve or by n on-off valves (page 8) (which excludes such a compensation mode in the case of a simulated moving bed wherein supply is ensured by one or more rotary valve(s);

each zone must have at least two beds since at certain particular times when the outlet from one zone passes the anisotropy (e.g. the non-selective free volume of the recycle pump) the effects of which are to be corrected, this zone is shortened by one bed (page 9). This condition can be greatly limiting, especially in the case in which the number of beds is reduced (4 to 12, for example).

Moreover, controlling the process becomes more complex, as can be seen in the switch time tables with and without compensation (pages 10 and 11 of FR-2 721 528), rendering that process very difficult to carry out.

FR-2 721 529 proposes reducing the volume of bed n by a volume equivalent to the volume of the discrete non-selective section such that overall, that bed has a volume identical to that of the other beds. This, as indicated (p7 line 26), can eliminate the vast majority of perturbations, but residual perturbations subsist. However in that case, bed n contains less molecular sieve than the other beds. The correction is thus not ideal, not least when the product under consideration is strongly adsorbed. This is a particular problem when the product to be separated is the most strongly adsorbed product.

Several advantageous variations can improve the function of that type of unit by making use of asynchronous permutations. In simplified manner, such asynchronous permutations act to compensate for the dead volume(s) of the recirculation pump(s), as indicated in U.S. Pat. No. 5,578,215, to operate with a constant recycle flow rate over the recirculation pump to eliminate sudden irregularities in the flow rate and pressure, as indicated in U.S. Pat. No. 5,762,806, or finally to operate with at least two chromatographic zones each being equivalent to a non-integral number of beds of adsorbent. This latter variation, as indicated in U.S. Pat. No. 6,136,198, U.S. Pat. No. 6,375,839, U.S. Pat. No. 6,712,973 and U.S. Pat. No. 6,413,419, is known under the name of Varicol. These three variations may be combined.

However, asynchronous variations introduce a supplemental complexity. It should also be noted that a multi-way rotary valve placing in communication the incoming and outgoing fluids and the beds disposed in the adsorption column or columns can only allow one synchronous type permutation. For asynchronous permutations, a plurality of on-off valves is vital.

The prior art discloses a variety of manners of producing adsorbant solid (the term "adsorbant" being equivalent thereto). The adsorbant used in fact depends on the separation which is carried out. In the case of industrially very important separation of para-xylene or meta-xylene from an aromatics cut containing 8 carbon atoms, a zeolitic adsorbant is used.

This use of zeolitic adsorbents is well known in the art. U.S. Pat. No. 3,558,730, U.S. Pat. No. 3,558,732, U.S. Pat. No. 3,626,020, U.S. Pat. No. 3,663,638 show in particular that adsorbents comprising aluminosilicates exchanged with barium and potassium or barium alone (U.S. Pat. No. 3,960,774) are effective in separating para-xylene from a C8 aromatics cut.

Said adsorbents are used as adsorption agents in liquid or gas phase processes, preferably of the simulated counter current type similar to those described in U.S. Pat. No. 2,985,589 which, inter alia, are applicable to aromatic C8 cuts (cut comprising aromatic hydrocarbons containing 8 carbon atoms).

In the references listed above, the zeolitic adsorbents are in the faun of a powder or in the form of agglomerates mainly constituted by zeolite and up to 15% to 20% by weight of inert binder.

Zeolites are usually synthesized by nucleation and crystallization of silicoaluminate gels to obtain powders the use of which on an industrial scale is particularly difficult (large pressure drops when manipulating); it is preferable to use agglomerations in the form of granules or grains which do not suffer from the drawbacks inherent to powdered materials.

Such agglomerates, whether in the form of platelets, beads or extrudates, are generally constituted by a zeolite powder which constitutes the active element (as regards adsorption) and a binder intended to cohere the crystals into the form of grains and to provide the grains with sufficient mechanical strength to resist the vibrations and movements to which they are subjected when used.

Such agglomerates are prepared, for example, by forming a zeolite powder into a paste with a clay-like paste in proportions of the order of 70% to 85% by weight of zeolite powder for 30% to 15% by weight of binder, then to form the beads, platelets or extrudates, and heat treatment at high temperature to fire the clay and reactivate the zeolite, barium exchange possibly being carried out before and/or after agglomeration of the powdered zeolite with the binder. Thus, EP-0 154 855 indicates (page 5 line 32-33) that the X zeolite/binder ratio varies from 70/30 to 90/10 by weight. U.S. Pat. No. 3,960,774 indicates (column 6 lines 42-44) that X or Y zeolites may be present in the precursor in concentrations which generally vary from 75% to 98% by weight. EP-0 115 068 proposes (page 6 line 23) and adsorbant in the form of an X zeolite exchanged with barium containing 20% of a clay-like binder.

Zeolitic bodies are obtained with a grain size of a few tenths of millimeters or several millimeters which, if the binder and grain size are selected in the normal manner of the art, have satisfactory overall properties, in particular as regards porosity, strength, and abrasion resistance. However, the adsorption properties of such agglomerates are substantially reduced compared with the active starting powder because of the presence of inert agglomeration binder.

A major characteristic of a bed (or a batch) of adsorbant solid is its adsorption capacity, i.e. the ratio of the volume of fluid which it can absorb over that of the volume of the bed (or batch) of adsorbant. In general, and conventionally in accordance with the invention, the Dubinin volume is selected to measure this capacity. The Dubinin volume is thus independent of the compound which is to be adsorbed and separated and only depends on the adsorbant: it is calculated using the Dubinin/Radushkevich relationship as described by LOWELL et al in the book "Characterization of Porous Solids and Powders: Surface Area, Pore Size and Density", Chapter 9, "Micropore Analysis", pages 143-145; Kluwer Academic Publishers, 2004, Dordrecht (NL).

The relationship: $\log V = \log V_0 - D(\log P/P_0)^2$ links the volume V of nitrogen adsorbed into the adsorbant material to the relative pressure $P/P_0$. The Dubinin volume is the volume $V_0$, the maximum volume of nitrogen vapour which can condense in the micropores of the adsorbant material. It is expressed in $cm^3$ of nitrogen vapour (brought to normal conditions) per gram of adsorbant.

Prior to measurement, the sample is pre-treated at 500° C. for 12 hours in a vacuum ($P<5\times10^{-6}$ Torr; i.e. $6.7\times10^{-4}$ Pa). The measurement is then carried out on an ASAP 2010 M type apparatus from Micromeritics. The graph of the isotherm is produced using a pressure table of at least 35 points between 0.01 and 1 $P/P_0$. The value of log V is plotted against $(\log(P/P_0))^2$. The Dubinin volume is obtained from the ordinate at the origin of the linear regression line of the points where $(\log(P/P_0))^2$ is in the range 1 to 2 (i.e. $0.039<P/P_0<0.1$). The uncertainty in the measurement is ±0.003.

Knowing the Dubinin volume, the volume of the bed and the weight of adsorbant loaded into this bed, the volume adsorption capacity can readily be found. Let us consider, for example, a bed 7 m in diameter and 1.13 m in height (volume 43.49 $m^3$) into which 37834 kg of adsorbent with a Dubinin volume of 0.22 $cm^3/g$ has been loaded. The adsorption capacity of this bed will be 8.32 $m^3$, or the volume fraction available for separation is 19.14%. In the remainder of the document, we shall term (C, or $C_0$ or $C_1$ or $C_2$) the adsorption capacity of a bed or a batch of adsorbant.

SIMPLIFIED DESCRIPTION OF THE INVENTION

The subject matter of the invention is a device for simulated moving bed separation following improved performances compared with prior art devices, in particular compared with the problems and drops in performances linked to the existence of one or more particular zones with a non-selective free volume due to the presence of individual non-selective volumes.

The improvement in performance provided may be different as a function of the target objective, by adapting the specifications and control parameters used in the separation process using the device under consideration. The improvement or improvements could, for example, include: reducing the demand for desorbant, reducing the desorbant/feed ratio, increasing the purity or recovery yield of the desired product or increasing the productivity of the process. These objectives and any other benefit provided may, of course, be combined at least to a certain extent.

Surprisingly, it has been discovered that this or these improvements could be obtained by the joint use, in this or these particular elementary zone(s):
a) of a reduced volume of adsorbent bed, in particular to compensate for the non-selective free volume;
b) of a particular adsorbent or a particular adsorbant composition, with an increased volume adsorption capacity compared with that of the adsorbant used for the ordinary elementary zones.

The invention also concerns the use of a device for particular separations, in particular for the separation of a xylene (in particular para-xylene or meta-xylene) from a C8 aromatics cut (containing 8 carbon atoms).

It also concerns the use of a device for the separation of an olefinic hydrocarbon, or one or more normal paraffinic hydrocarbons from a mixture of hydrocarbons comprising hydrocarbons of another chemical family.

Finally, it concerns a corresponding process for loading adsorbant into a simulated moving bed SMB device starting from N batches of adsorbant.

DETAILED DESCRIPTION OF THE INVENTION

In order to improve the separation performance which may be obtained using SMB techniques, the invention thus proposes a device for separating a feed F by simulated moving bed adsorption, comprising a plurality of elementary zones $Z_i$ in series operating in a closed loop, each of said zones comprising, between two successive points for sequential injection (of feed or eluent) or for sequential extraction (of extract or raffinate), a unique bed $L_i$ of adsorbant solid with volume $VA_i$ and a volume for movement in the loop which is free of adsorbant, termed the non-selective free volume $V_i$, in which at least 3 zones $Z_i$ each comprise a unique bed of adsorbant with a volume which is substantially identical to VA, and a non-selective free volume which is substantially identical to V, said zones being termed ordinary elementary zones,
the device also comprising, from among zones $Z_i$, at least one elementary zone $Z_0$ termed the particular elementary zone, which is different from the ordinary zones, $Z_0$ comprising a non-selective free volume $V_0$ which is greater than V and a unique bed $L_0$ of adsorbant solid with volume $VA_0$ which is less than VA;
in which the same adsorbant mean solid S is used for the beds of the various ordinary zones and an adsorbant mean solid $S_0$ which is different from S is used for the bed of said particular elementary zone $Z_0$, the volume adsorption capacity $C_0$ of $S_0$ being more than that, i.e. C, of the solid S, such that the overall adsorption capacity $C_0 \times VA_0$ of the particular elementary zone $Z_0$ is closer to or equal to the overall adsorption capacity $C \times VA$ of each of the ordinary elementary zones than the overall adsorption capacity of $Z_0$ calculated as if the adsorbant solid of bed $L_0$ of $Z_0$ were not the mean solid $S_0$ but the mean solid S.

This thus means that the following relationship is satisfied:

$|C \times VA - C_0 \times VA_0| \leq C \times VA - C \times VA_0$

Preferably, the differences in the overall adsorption capacity of the particular elementary zone $Z_0$ is reduced by at least 30%, highly preferably by at least 70% with respect to the overall adsorption capacity of each of the ordinary elementary zones.

Thus, preferably:

$|C \times VA - C_0 \times VA_0| < 0.7 \times |C \times VA - C \times VA_0|,$ or highly preferably:

$|C \times VA - C_0 \times VA_0| < 0.3 \times |C \times VA - C \times VA_0|$

Ideally, the overall adsorption capacities of all of the zones are equal, and:

$|C \times VA - C_0 \times VA_0| = 0.$

Typically, an overall volume $V_0 + VA_0$ is used which is very close to V+VA, for example different from V+VA by at most 3%, or it is identical.

The term "mean solid" simply means that the adsorbant solid is not necessarily homogeneous, although it may be so.

In one embodiment of the device, (at least) two adsorbents are used with a different adsorption capacity and the proportion of the mixture of said two adsorbents is varied between the ordinary elementary zones and the particular elementary zone or zones. In general, the adsorbant mean solid $S_0$ is thus a mixture of at least two adsorbant solids $S_1$ and $S_2$ with different volume adsorption capacities, respectively $C_1$ and $C_2$, with $C_1 > C_2$, $S_1$ being the adsorbant solid comprised in the device and having the highest volume adsorption capacity, the percentage of $S_1$ in each of the beds of the ordinary elementary zones being either zero or less than the percentage of $S_1$ in the bed $L_0$ of the particular elementary zone $Z_0$.

In this option, then, the volume adsorption capacity of the particular elementary zone $Z_0$ is increased by using in this zone an adsorbant solid $S_1$ with a higher volume adsorption capacity present in a proportion which is greater than that used in each of the ordinary zones.

The beds of the ordinary elementary zones may optionally contain an adsorbant mean solid S with a percentage of adsorbant solid $S_1$ of zero.

The beds of the ordinary elementary zones may optionally be constituted by a unique homogeneous adsorbant solid S with a volume adsorption capacity C. In this case, the adsorbant mean solid $S_0$ comprises at least one other adsorbant solid $S_1$ with a higher volume adsorption capacity, i.e. $C_1$ with $C_1 > C$.

One manner of carrying out the invention is thus to produce and install, in the particular elementary zone or zones, an adsorbant solid with a macroporous volume which is greater than that of the adsorbant used in the ordinary elementary zones.

In the case in which a zeolitic adsorbant is used comprising crystals of zeolite agglomerated by a binder, the binder is typically inert as regards adsorbant performance. To increase the effective macroporous volume for separation, various means have been proposed: the use of more cohesive binders has already been proposed, which can then reduce the quantity of binder used, or the transformation of the binder, all or part thereof, into zeolite, or zeolitisation. In order to carry out this operation easily, zeolitisable binders are used which belong to the kaolinite family, which have been calcined at temperatures in the range 500° C. to 700° C.

In that method, FR-2 767 524 A1 proposes an adsorbant with a binder content (page 3 lines 25-27) which does not exceed 20% by weight before transformation of at least a portion of the binder into zeolite, and (page 4 line 4) with an amount of at most 10% of inactive material after said transformation. Similarly, International patent application WO-99110096 indicates (page 3 lines 11-12) that the practical binder content of the agglomerate generally does not exceed 30% and preferably 20% of the total mass of the adsorbant. The same document then indicates (page 3 lines 23-26) that after transformation of the binder into zeolite, the resulting adsorbant is generally constituted by at least 85% and preferably at least 90% of active faujasite type zeolite and at most 15%, preferably at most 10% of inactive material for adsorption. U.S. Pat. No. 3,119,660 indicates (column 14 lines 62-64) that composites produced by mixing 4A zeolite powder with a clay-like binder has a capacity factor of approximately 0.56. Table IV of the same document (column 15) then indicates that these same agglomerates, after transformation of at least a portion of the binder into zeolite, has adsorption factors in the range 0.70 to 0.74 depending on the operating protocol selected for the binder transformation step.

One variation consists of moulding the grains of kaolin then zeolitising the kaolin; the principle has been discussed in "Zeolite Molecular Sieves" by D W Breck, John Wiley and Sons, New York, p 320 ff. This technique has been applied with success to obtaining grains of A zeolite or X zeolite constituted by up to 95% by weight of zeolite per se and a residual non-transformed binder.

Depending on the separation under consideration, in accordance with the invention the skilled person can use any suitable method for increasing the volume adsorption capacity of the adsorbent used in the particular elementary zone or zones.

Advantageously, it is also possible to produce the two types of adsorbant from the same adsorbent fabricated from a typically high number of batches from the same fabrication run (for example successive fabrication runs or parallel fabrication runs using the same process); this may be carried out by measuring the adsorption capacity of each batch and selecting the batches with the highest capacity for the particular elementary zone.

Thus, the invention also proposes a process for loading, into a device for separation by simulated moving bed adsorption, said device comprising n elementary zones $Z_i$, n being in the range 3 to 30, an adsorbant available in the form of N fabrication batches of said adsorbant using the same fabrication process, N being in the range 60 to 3000, in which:
  a) the volume adsorption capacity of each of the fabrication batches is measured individually;
  b) from the individual measurements of the volume adsorption capacity obtained thereby, a first adsorbant S is selected which is loaded into the ordinary elementary zones and a second adsorbant $S_0$ is selected with a volume adsorption capacity which is greater than that of S, which is loaded into the particular zone $Z_0$, whereupon the device is a device as described above.

The device may also comprise several particular elementary zones and then at least a fraction of the second adsorbent $S_0$ alone or mixed with a fraction of the first adsorbent S is loaded into each of said particular elementary zones so that the adsorbent obtained and loaded into said zone is such that at least one of the cited inequalities is satisfied, or the equality corresponding to an identical adsorption capacity: $|C \times VA - C_0 \times VA_0|=0$ is satisfied.

The use of different adsorbents from batches of the same fabrication run can avoid having to employ different fabrication lines.

By way of example, it is possible to produce a selection from a fabrication run for molecular sieve intended for a SMB separation unit comprising 24 elementary zones $Z_i$, including 23 ordinary zones and one particular zone $Z_0$. If, for example, 1000 t of molecular sieve has to be loaded, this product may be packaged into 1 t batches, for example unitary 1 t fabrication batches. For each batch, it is possible to measure the Dubinin volume (or the adsorbed volume of a compound other than nitrogen, in a strictly proportional manner, for example the hydrocarbon which is to be separated). For an average Dubinin volume, or its equivalent expressed as a volume, for example 19%, 100% of the batches will typically be in the range 18% to 20%. Next, it is possible to select the 4.2% of batches with the best capacity (having, for example, a mean of 19.85% of volume for adsorption); the remainder of the fabrication run will have a mean capacity of 18.95% of volume for adsorption. Next, an adsorbant with a mean adsorption capacity which is 5% higher than that of the remainder of the adsorbant loaded into the ordinary elementary zones will be loaded into the particular zone $Z_0$.

The invention also concerns the use of a device for carrying out the particular separations.

In particular, it concerns the use of a device for separating a xylene, for example para-xylene or meta-xylene from a cut of aromatic hydrocarbons containing 8 carbon atoms.

It also concerns the use of a device for separating an olefinic hydrocarbon from a cut comprising said hydrocarbon mixed with other non olefinic hydrocarbons.

It also concerns the use of a device for separating at least one linear paraffin from a cut comprising said linear paraffin or paraffins mixed with other hydrocarbons which are not linear paraffins.

DESCRIPTION OF THE FIGURE

The single FIGURE, FIG. 1, diagrammatically shows a portion of a simulated moving bed separation device in accordance with the invention.

It shows, in partial and simplified manner, a column comprising 24 beds of adsorbant solid $L_1, L_2, \ldots L_{22}, L_{23}$ and $L_{24}$ (corresponding to $L_0$). Each of said beds is represented by a hatched rectangle. Between two successive beds of the column we show a non-selective, non-hatched free volume corresponding to the internal free volume of the column for the system for distribution/extraction of the various fluids which are supplied and withdrawn, which is also flushed by the principal fluid moving in the column.

The non-free volumes, for example the volumes of the metallic portions of the distributor/extractor plates or the support beams of said plates are not counted as non-selective free volumes.

Conventionally, the volumes between the grains of adsorbant and those inside the grains of adsorbant are also not taken into account.

Finally, the non accessible volumes of the fluids moving in the loop in the column or in the external bypasses are also not taken into account. This is the case, for example, with the volumes of the supply/extraction connectors of the incoming fluids (supply) and outgoing fluids (withdrawal), which are not flushed with the principal fluid moving in the column nor by the principal fluid moving in the external bypass lines, but only by one or more incoming or outgoing fluids.

In contrast, the "non-selective free volume" also includes a certain number of volumes which are external to the column:
  for each elementary zone, the internal volume of the external bypass line is taken into account if it exists (in FIG. 1: 1', 2 and 3' for $Z_1$ and 4', 5 and 6' for $Z_{23}$) to allow limited flow rate flushing of the distributor plates outside the fluid distribution and extraction phases. In contrast, as already mentioned, the non-selective free volume corresponding to an elementary zone does not take into account the volumes which are not flushed with the principal fluid during operation of the bypass lines (connectors 1, 3, 4 and 6 in FIG. 1, up to the upstream multi-way valve, not shown, or up to the various upstream 2-way valves, not shown, controlling the sequential operation of the device). In the case in which a connector which is not flushed with the principal fluid but only by one or more incoming or outgoing fluids, enters the column, its volume is also not taken into account for the portion upstream of its point of entry into the "mixing box" with the principal fluid moving as a loop in the column (this mixing box is not shown in FIG. 1);

the individual volumes corresponding to the lines for transfer of principal fluid (between two columns if appropriate) or the line for recycling from a column bottom to the head of that same column. These various individual volumes typically include the internal volumes of these lines but also the internal volumes of the pump(s) or compressor(s) allowing closed loop movement of the fluid in the device. They may also include the internal volumes of measurement apparatus such as the analyzers, etc.

Each bed $L_i$ of adsorbant solid conventionally belongs, in accordance with the invention, to an elementary zone $Z_i$ which also includes a non-selective free volume $V_i$ typically composed of several different distinct non-selective free volumes.

Conventionally, in accordance with the invention, half of each non-selective free volume corresponding to a plate located between two successive beds of adsorbant (non-hatched volume between two successive beds of adsorbant with a median line shown as a dotted line) is applied to the zone $Z_i$ including the immediately upstream bed of adsorbant $L_i$, and the other half is applied to the zone $Z_{i+1}$ including the immediately downstream bed of adsorbant $L_{i+1}$.

The device of FIG. 1 has a common distribution/extraction network as shown by the double headed arrows in lines 1/1', 3/3', 4,4', 6,6'. In addition to the bed of adsorbant $L_1$, zone $Z_1$ includes half of the non-selective free volume of the upstream distribution system (at the column head) and half of the non-selective free volume of the downstream distribution system (between beds $L_1$ and $L_2$). It also includes the internal volume of the external bypass line 2 if it exists, i.e. in this case that of lines 1', 2 and 3', also counted as the non-selective free volume while the volume of connectors 1 and 3 is not.

Zone $Z_{23}$ below bed $L_{22}$ comprises similar elements to those of zone $Z_1$. In addition to the bed of adsorbant $L_{23}$, it includes half of the non-selective free volume of the upstream distribution system (between beds $L_{22}$ and $L_{23}$) and half of the non-selective free volume of the downstream distribution system (between beds $L_{23}$ and $L_{24}$). It also includes the internal volume of the external bypass line 5 if it exists, i.e. in this case that of lines 4', 5 and 6', also counted as a non-selective free volume while the volume of connectors 4 and 6 are not. In accordance with the invention, zones $Z_1$ and $Z_{23}$ as well as all of the identical intermediate zones are ordinary elementary zones, each having a substantially identical volume of adsorbant bed and a substantially identical non-selective free volume.

In contrast, zone $Z_{24}$ is particular: it includes the individual supplemental non-selective free volumes corresponding to the recycle line 7 then 9, as well as the recycle pump 8. These supplemental individual non-selective free volumes are not negligible compared with the non-selective free volume of each of the ordinary elementary zones. As a result, to correct for the deleterious effect of these supplemental non-selective free volumes, a smaller volume of adsorbant solid is used for the adsorbant bed $L_{24}$ of zone $Z_{24}$.

In accordance with the invention, in zone $Z_{24}$ (which corresponds to the particular elementary zone $Z_0$ described above) a mean adsorbant $S_0$ is used which is different from the mean adsorbant S used in the other zones (ordinary elementary zones). This adsorbant $S_0$ has a volume adsorption capacity $C_0$ which is higher than the volume adsorption capacity C of the adsorbant solid S used in the ordinary elementary zones, such that it compensates for the reduction in the volume of the bed of adsorbant $L_{24}$ the overall adsorption capacity of which can be maintained.

In particular, $S_0$ may be constituted by a homogeneous adsorbant $S_1$ with a high volume adsorption capacity or by a mixture of a first quantity of such an adsorbant $S_1$ with another suitable quantity of adsorbant S.

EXAMPLES

Example 1

In Accordance with the Prior Art

Para-xylene was separated from a feed composed of 20% of para-xylene, 25% of ortho-xylene, 50% of meta-xylene and 5% of ethylbenzene.

The simulated moving bed SMB separation facility comprised 24 beds of adsorbant solid installed in a column with an internal diameter of 7 m. Beds numbers 1 to 23, numbered from the head of the column, were identical in height at 1.13 m. A recycle line with a non-selective free volume of 10% of the common volume of beds numbers 1 to 23, and including the recycle pump, connected bed number 24 at the column bottom to bed number 1 located at the column head.

This recycle line was located in the elementary zone included between the injection/extraction point located between beds numbers 23 and 24 and the injection/extraction point located at the column head upstream of bed number 1. This recycle line thus belonged to the particular elementary zone corresponding to bed number 24 of adsorbant.

In order to compensate for the effect of this non-selective volume, in accordance with the prior art, the volume of the $24^{th}$ bed was reduced by an equivalent volume. This $24^{th}$ bed was thus 1.02 m in height instead of 1.13 min height.

The adsorbant solid S employed was a unique homogeneous adsorbant which was identical in all of the beds, namely a BaX type zeolite fabricated as described in Example 1 of patent FR-2 789 914 (page 7-8) or in Example 1 of U.S. Pat. No. 6,884,918 (column 6). Its microporous volume, measured using the Dubinin-Radushkevich method, was 0.22 $cm^3/g$.

The eluent used was para-diethyl benzene (PDEB). The mean temperature was 175° C. and the pressure was 1.5 MPa.

The distribution of the beds was as follows:
5 beds in zone 1;
9 beds in zone 2;
7 beds in zone 3;
3 beds in zone 4.

The permutation time employed was 70.8 seconds. The liquid flow rates in the various zones were as follows:
30.06 $m^3 \cdot min^{-1}$ in zone 1;
25.87 $m^3 \cdot min^{-1}$ in zone 2;
32.66 $m^3 \cdot min^{-1}$ in zone 3;
22.58 $m^3 \cdot min^{-1}$ in zone 4.

Under these conditions, we obtained a para-xylene purity of 99.73% and a para-xylene yield of 95.6%.

Example 2

In Accordance with the Invention

The same separation as in Example 1 was carried out under identical conditions (pressure, temperature, permutation time) in a column with the same diameter also comprising 24 beds, with the same distribution of beds per zone, using the same eluent, PDEB. The recycle line was identical to that in Example 1.

The adsorbant solid S used in beds numbers 1 to 23 was identical to that used in Example 1 above, and these beds were also 1.13 m in height.

The only difference over Example 1 concerned bed number 24 at the column bottom: its height was also reduced by approximately 10% to 1.02 m instead of 1.13 m, but in accordance with the invention, an adsorbant solid $S_0$ was used in this bed number 24 which differed from the adsorbant solid S used in the other beds:

The adsorbant solid $S_0$ was produced as described in Example 2 of patent FR-2 789 914 (page 8-9) or in Example 2 of U.S. Pat. No. 6,884,918 (columns 6-7). A microporous volume of 0.244 cm$^3$/g was thus obtained. The volume adsorption capacity of the adsorbant solid $S_0$ of the 24$^{th}$ bed was thus greater than that of the adsorbant solid S in the remainder of the device by approximately 10%, which compensated for the reduction in adsorbant volume in the particular elementary zone $Z_0$ corresponding to the 24$^{th}$ bed.

Under these conditions, we obtained a para-xylene purity of 99.74% and a para-xylene yield of 96.2%. This yield, for a substantially identical para-xylene purity, was substantially higher than that obtained in the prior art.

The scope of the invention is not limited to the above description; the skilled person is at liberty to employ any suitable feature included in the prior art.

The invention claimed is:

1. A device for separating a feed F by simulated moving bed adsorption, said device comprising:
a plurality of elementary zones $Z_i$ in series operating in a closed loop, each of said zones comprising, between two successive points for sequential injection of feed or eluent or for sequential extraction of extract or raffinate, a unique bed $L_i$ of adsorbant solid with volume $VA_i$ and a volume for movement in the loop which is free of adsorbant, termed the non-selective free volume $V_i$, in which at least 3 zones $Z_i$ each comprise a single bed of adsorbant with a volume which is substantially identical to VA, and a non-selective free volume which is substantially identical to V, said zones being termed ordinary elementary zones;
the device also comprising, from among zones $Z_i$, at least one elementary zone $Z_0$ termed the particular elementary zone, which is different from the ordinary elementary zones, $Z_0$ comprising a non-selective free volume $V_0$ which is greater than V and a unique bed $L_0$ of adsorbant solid with volume $VA_0$ which is less than VA;
in which the same adsorbant mean solid S is used for the beds of said ordinary elementary zones and an adsorbant mean solid $S_0$, which is different from S, is used for the bed of said particular elementary zone $Z_0$, the volume adsorption capacity $C_0$ of $S_0$ being more than the volume adsorption capacity C of the solid S, such that the overall adsorption capacity, $C_0 \times VA_0$, of said particular elementary zone $Z_0$ is closer to the overall adsorption capacity, $C \times VA$, of each of said ordinary elementary zones than the overall adsorption capacity of $Z_0$ calculated as if the adsorbant solid of bed $L_0$ of $Z_0$ were the solid S, thereby satisfying the following relationship:

$$|C \times VA - C_0 \times VA_0| \leq C \times VA - C \times VA_0.$$

2. A device according to claim 1, in which:

$$|C \times VA - C_0 \times VA_0| < 0.7 \times |C \times VA - C \times VA_0|.$$

3. A device according to claim 2, in which:

$$|C \times VA - C_0 \times VA_0| < 0.3 \times |C \times VA - C \times VA_0|.$$

4. A device according to claim 3, in which: $|C \times VA - C_0 \times VA_0| = 0$.

5. A device according to claim 1, in which the adsorbant mean solid $S_0$ is a mixture of at least two adsorbant solids $S_1$ and $S_2$ with different volume adsorption capacities, respectively $C_1$ and $C_2$, with $C_1 > C_2$, $S_1$ being the adsorbant solid comprised in the device and having the highest volume adsorption capacity, and in which the percentage of $S_1$ in each of the beds of said ordinary elementary zones is either zero or less than the percentage of $S_1$ in the bed $L_0$ of said particular elementary zone $Z_0$.

6. A device according to claim 5, in which the percentage of $S_1$ in each of the beds of the ordinary elementary zones is zero.

7. A device according to claim 1, in which the adsorbant mean solid in each of the beds of the ordinary elementary zones is constituted by a unique homogeneous adsorbant solid S with a volume adsorption capacity C and in which the adsorbant mean solid $S_0$ comprises at least one other adsorbant solid $S_1$ with a higher volume adsorption capacity, $C_1$, where $C_1 > C$.

8. A process for separating a xylene from a cut of aromatic hydrocarbons containing 8 carbon atoms, comprising separating xylene from said cut in a device according to claim 1.

9. The process according to claim 8, wherein para-xylene is separated from said cut of aromatic hydrocarbons containing 8 carbon atoms.

10. The process according to claim 9, wherein said cut of aromatic hydrocarbons containing 8 carbon atoms contains para-xylene, ortho-xylene, meta-xylene and ethylbenzene.

11. A process for separating an olefinic hydrocarbon from a cut comprising said hydrocarbon as a mixture with other hydrocarbons at least some of which are non-olefinic, said process comprising separating said olefinic hydrocarbon from said cut in a device according to claim 1.

12. A process for separating at least one linear paraffin from a cut comprising said linear paraffin or paraffins as a mixture with other hydrocarbons which are not linear paraffins, said process comprising separating said at least one linear paraffin from said cut in a device according to claim 1.

13. A process for loading, into a device for separation by simulated moving bed adsorption, said device comprising n elementary zones $Z_i$, n being in the range 3 to 30, an adsorbant available in the form of N fabrication batches of said adsorbant using the same fabrication process, N being in the range 60 to 3000, in which the volume adsorption capacity of each of the fabrication batches is measured individually;
said process comprising, from the individual measurements of the volume adsorption capacity obtained, selecting a first adsorbant S and loading said first adsorbant S into the ordinary elementary zones of the device according to claims, and selecting a second adsorbant $S_0$ with a volume adsorption capacity which is greater than that of S, and loading said second adsorbant $S_0$ into said particular zone $Z_0$ of said device according to claim 1.

14. A process according to claim 13, in which the device comprises a plurality of particular elementary zones and at least a fraction of the second adsorbant $S_0$ is loaded into each of said particular elementary zones, alone or mixed with a fraction of the first adsorbant S so that the adsorbant obtained is such that the following inequality is satisfied, $$|C \times VA - C_0 \times VA_0| < 0.7 \times |C \times VA - C \times VA_0|.$$

15. A process according to claim 13, in which the device comprises a plurality of particular elementary zones and at least a fraction of the second adsorbant $S_0$ is loaded into each of said particular elementary zones, alone or mixed with a fraction of the first adsorbant S so that the adsorbant obtained is such that the following inequality is satisfied, $$|C \times VA - C_0 \times VA_0| < 0.3 \times |C \times VA - C \times VA_0|.$$

16. A process according to claim 13, in which the device comprises a plurality of particular elementary zones and at least a fraction of the second adsorbant $S_0$ is loaded into each of said particular elementary zones, alone or mixed with a fraction of the first adsorbant S so that the adsorbant obtained is such that the following equality is satisfied, $$|C \times VA - C_0 \times VA_0|.$$

17. A device according to claim 1, wherein the volume $V_0 + VA_0$ of said particular elementary zone differs from the volume $V + VA$ of each ordinary elementary zones by at most 3%.

18. A device according to claim 1, wherein an adsorbant mean solid $S_0$ of said particular elementary zone $Z_0$ has a microporous volume which is greater than the microporous volume of adsorbant mean solid S of said ordinary elementary zones.

* * * * *

UNITED STATES PATENT AND TRADEMARK OFFICE
CERTIFICATE OF CORRECTION

PATENT NO. : 8,821,732 B2  
APPLICATION NO. : 12/809858  
DATED : September 2, 2014  
INVENTOR(S) : Leflaive et al.

Page 1 of 1

It is certified that error appears in the above-identified patent and that said Letters Patent is hereby corrected as shown below:

In the Claims

Claim 1, Column 13, line 64 reads "$| C \times VA - C_0 \times VA_0 \leq C \times VA - C \times VA_0.$"
should read -- $| C \times VA - C_0 \times VA_0 | \leq C \times VA - C \times VA_0.$ --

Signed and Sealed this  
Thirty-first Day of March, 2015

Michelle K. Lee  
*Director of the United States Patent and Trademark Office*